United States Patent
Tejada et al.

(10) Patent No.: US 8,570,411 B2
(45) Date of Patent: Oct. 29, 2013

(54) SOLID STATE IMAGE PICKUP DEVICE AND DRIVING METHOD THEREFORE SELECTING A FIRST SIGNAL OR A SEQUENTALLY OUTPUT SECOND SIGNAL FOR EACH PIXEL

(75) Inventors: Jose Tejada, Valencia (ES); Rafael Dominguez-Castro, Seville (ES); Fernando Medeiro-Hidalgo, Seville (ES); Francisco J. Jimenez-Garrido, Seville (ES)

(73) Assignee: Texas Instruments Incorporated, Dallas, TX (US)

( * ) Notice: Subject to any disclaimer, the term of this patent is extended or adjusted under 35 U.S.C. 154(b) by 368 days.

(21) Appl. No.: 12/701,826

(22) Filed: Feb. 8, 2010

(65) Prior Publication Data
US 2010/0265373 A1 Oct. 21, 2010

(30) Foreign Application Priority Data
Feb. 6, 2009 (JP) ................................. 2009-026409

(51) Int. Cl.
*H04N 5/335* (2011.01)
(52) U.S. Cl.
USPC ........................................ 348/297; 348/222.1
(58) Field of Classification Search
USPC .............................................. 348/297, 222.1
See application file for complete search history.

(56) References Cited

U.S. PATENT DOCUMENTS

| | | | |
|---|---|---|---|
| 5,715,515 A * | 2/1998 | Akins et al. | 725/142 |
| 6,249,359 B1 * | 6/2001 | Aoki et al. | 358/473 |
| 7,239,805 B2 * | 7/2007 | Uyttendaele et al. | 396/222 |
| 7,813,635 B2 * | 10/2010 | Tamura | 396/155 |
| 2004/0263650 A1 * | 12/2004 | Park et al. | 348/266 |
| 2005/0190271 A1 * | 9/2005 | Chiang et al. | 348/222.1 |
| 2007/0160357 A1 * | 7/2007 | Lin et al. | 396/65 |
| 2008/0181597 A1 * | 7/2008 | Tamura | 396/164 |
| 2009/0290037 A1 * | 11/2009 | Pore | 348/222.1 |

* cited by examiner

*Primary Examiner* — Usman Khan
(74) *Attorney, Agent, or Firm* — Robert D. Marshall, Jr.; Wade James Brady, III; Frederick J. Telecky, Jr.

(57) ABSTRACT

The objective of this invention is to provide a solid-state image pickup device and its driving method that has a minimum circuit area and a wide dynamic range. The invention includes: a sensor array SA; a memory M; and a signal determination circuit DC. The sensor array has plural pixels in an array integrated on a semiconductor substrate. Each pixel sequentially outputs a first signal and a second signal. The memory M is connected to each column of pixels array and stores the first signal or the second signal. The signal determination circuit DC outputs signal (SS) such that it works as follows: when the first signal is input to memory M from the pixel, the signal determination circuit DC determines whether the first signal can be used. If so, the first signal is selected and the second signal is discarded and is not output to memory M. When the second signal is selected, the second signal is uploaded to memory M.

10 Claims, 15 Drawing Sheets

SOLID STATE IMAGE PICKUP DEVICE AND DRIVING METHOD THEREFORE SELECTING A FIRST SIGNAL OR A SEQUENTALLY OUTPUT SECOND SIGNAL FOR EACH PIXEL

CLAIM OF PRIORITY

This application claims priority under 35 U.S.C. 119(a) to Japanese Patent Application No. 2009-026409 filed Feb. 6, 2009.

TECHNICAL FIELD OF THE INVENTION

The present invention pertains to a solid-state image pickup device and its driving method. Especially, the present invention pertains to a solid-state image pickup device consisting of a CMOS image sensor and its driving method.

BACKGROUND OF THE INVENTION

For a CMOS (Complementary Metal-Oxide-Semiconductor) image sensor, a CCD (Charge Coupling Device) image sensor or other image input image sensors, as their characteristics improved the requirements of their application in digital cameras, camera-equipped cell phones, etc. increased.

The development of even better characteristics for image sensors is desired. One improved characteristic would be wider dynamic range.

For example, the prior art represented by Japanese Kokai Patent Application No. 2003-134396, Japanese Kokai Patent Application No. 2000-165754, Japanese Kokai Patent Application No. 2002-77737 and Japanese Kokai Patent Application No. Hei 5[1993]-90556 disclose solid-state image pickup devices with wider dynamic ranges. However, for the solid-state image pickup devices described in these references, it is difficult to realize a wider dynamic range while maintaining high sensitivity and a high signal to noise (S/N) ratio. The solid-state image pickup device described in Japanese Kokai Patent Application No. 2005-328493 was developed to solve this problem.

For the solid-state image pickup device described in Japanese Kokai Patent Application No. 2005-328493, the photoelectric charge flowing from the photodiode of each pixel is accumulated in a floating diffusion and an electrostatic capacitive element. As the signal for each pixel, if no photoelectrons are flowing from the photodiode, an S1 signal is read from the photoelectrons in the photodiode. If photoelectrons flow out of the photodiode, the photoelectrons in the photodiode and the photoelectrons flowing from the photodiode are merged to read an S2 signal.

For the solid-state image pickup device described in Japanese Kokai Patent Application No. 2005-328493, the floating diffusion at each pixel is connected to the gate electrode of an amplification transistor, known as a source follower. The photoelectric charge is converted to a voltage that is subjected to current amplification as the current between the source and drain of the transistor in the source follower. The signal level is held in the analog memory in the solid-state image pickup device and read for each line.

FIG. 14 is a schematic diagram illustrating a CMOS image sensor of the prior art.

Sensor array SA has plural pixels integrated in an array configuration to form a light-receiving surface. Analog memories M1 and M2 are arranged in two directions and are connected to the various lines of the array.

Analog memory M1 has two capacitors for each line. From each pixel, signal N1 is the noise level corresponding to the signal S1 and signal NS1 is the difference between signal N1 and signal S1 (N1-S1). These signals are stored in the two capacitors of analog memory M1 and then output.

Analog memory M2 has two capacitors for each line. From each pixel, signal N2 is the noise level corresponding to the signal S2 and signal NS2 as the difference between signal N2 and signal S2 (N2-S2). These signals are stored in the two capacitors of analog memory M2 and then output.

FIG. 15 is an equivalent circuit diagram illustrating the overall circuit construction of the CMOS image sensor of the prior art.

FIG. 15 illustrates an exemplary plurality of 4 pixels (Pixel) arranged in an array configuration. Each pixel (Pixel) is connected to the driving lines ($\phi_T$, $\phi_S$, $\phi_R$, $\phi_X$) controlled by row shift register $SR^V$, power supply VDD, ground GND, etc.

Under control of column shift register $SR^H$ and driving lines ($\phi_{NS1}$, $\phi_{N1}$, $\phi_{NS2}$, $\phi_{N2}$), the signal N1, signal NS1, signal N2 and signal NS2 from each pixel (Pixel) are stored in analog memories M1 and M2 having capacitors CAP. These signals are then output. Because FIG. 15 shows an equivalent circuit diagram, the analog memories M1 and M2 are shown in one direction. In practice sensor array SA is arranged between analog memory M1 and analog memory M2 as shown in FIG. 14.

FIG. 16 is a flow chart illustrating the operation of the CMOS image sensor of the prior art. The steps of operation performed for each line are explained below.

First, as first step ST1, signal S1 is read. It is obtained by reading the signal NS1 and signal N1 to analog memory M1, followed by computing their difference.

Then, as the second step ST2, signal S2 is read. It is obtained by reading the signal NS2 and signal N2 to analog memory M2, followed by computing their difference.

Then, as the third step ST3, signal S1 and signal S2 read as mentioned previously are output.

Then, as the fourth step ST4, signal S1 is checked for each pixel. That is, as shown in the fifth step ST5, signal S1 is compared with a prescribed threshold T.

If signal S1 is below threshold T, as shown in the sixth step ST6, signal S1 is used as the pixel signal.

On the other hand, if signal S1 is above threshold T, as shown in the seventh step ST7, signal S2 is used as the pixel signal.

Then, as shown in the eighth step ST8, for the next pixel, the fifth step ST5 and thereafter are repeated.

For the CMOS image sensor having this construction, after read of signal S1 and signal S2 from each pixel, the necessary signal of signal S1 and signal S2 is determined.

Consequently, in addition to an analog memory for obtaining signal S1, an output system and an A/D converter for generating signal S1, an analog memory for obtaining signal S2, an output system and an A/D converter for generating signal S2 are needed for this construction.

Especially, the analog memory consisting of a capacitor, etc., and the A/D converter are large with respect to the overall CMOS image sensor, and this is a factor preventing miniaturization of a CMOS image sensor.

The problem to be solved is as follows: in a solid-state image pickup device with a wider dynamic range, the circuit for signal S1 and the circuit for signal S2 are arranged as similar circuits, and miniaturization of the device is difficult.

SUMMARY OF THE INVENTION

The present invention provides a solid-state image pickup device characterized by the fact that it has the following parts:

a sensor array prepared by integrating plural pixels, each of which sequentially outputs a first signal and a second signal as pixel outputs, in an array configuration on a semiconductor substrate; a memory that is arranged for each column of the integrated pixel array and that stores the first signal and the second signal; and a signal determination circuit that outputs signals such that the following operation is carried out when the first signal is input from the pixel to the memory, it is determined whether the first signal can be selected if the first signal is selected, the second signal is discarded and is not output to the memory; when it is determined that the second signal is selected, the second signal in the memory is uploaded.

For the aforementioned solid-state image pickup device of the present invention, there are a sensor array, memory and a signal determination circuit.

The sensor array consists of plural pixels, each of which sequentially outputs a first signal and a second signal as pixel outputs, formed in an array configuration on a semiconductor substrate.

The memory is arranged for each column of the pixels integrated in an array configuration, and stores the first signal or the second signal.

The signal determination circuit works as follows: when the first signal is input from the pixel to the memory, whether the first signal can be used as the pixel signal is determined; if it is determined that the first signal is selected, the second signal is not output to the memory, and, when it is determined that the second signal is selected, the second signal is uploaded to the memory.

As a preferable scheme for the solid-state image pickup device of the present invention, each pixel has the following parts: a photodiode that receives light to generate photoelectric charge and stores the generated photoelectric charge; a transfer transistor that transfers the photoelectric charge from the photodiode; a floating diffusion that transfers the photoelectric charge through the transfer transistor; an accumulating capacitive element, which is arranged connected to the photodiode via the transfer transistor and which works in an accumulating operation so that photoelectric charge flowing out from the photodiode is at least accumulated in it via the transfer transistor, an accumulating transistor, which couples or separates the floating diffusion and the potential of the accumulating capacitive element coupled, and which has one source/drain region as the floating diffusion and connects the other source/drain region to the floating diffusion; and an amplification transistor having a gate electrode connected to the floating diffusion; when the accumulating transistor is turned off, a signal corresponding to the signal charge accumulated in the floating diffusion is output as the first signal, and when the accumulating transistor is turned on, a signal corresponding to the signal charge accumulated in the floating diffusion and the accumulating capacitive element is output as the second signal.

As a preferable scheme for the aforementioned solid-state image pickup device of the present invention, the signal determination circuit compares the first signal with a prescribed threshold, and if the first signal is below the prescribed threshold, the first signal is selected. If the first signal is above the threshold, the second signal is selected.

As a preferable scheme for the aforementioned solid-state image pickup device of the present invention, the signal determination circuit generates a selection bit that indicates whether the first signal and the second signal is selected, and the selection bit is output.

As a preferable scheme for the aforementioned solid-state image pickup device of the present invention, it has a reset transistor, which is connected to the accumulating capacitive element or the floating diffusion, and which exhausts the photoelectric charge in the accumulating capacitive element and/or the floating diffusion.

As a preferable scheme for the aforementioned solid-state image pickup device of the present invention, it has a selecting transistor for selecting the pixel and a gate electrode for the selecting transistor and is connected in series with the amplification transistor.

The present invention provides a driving method for the solid-state image pickup device characterized by the following processes: according to this driving method for the solid-state image pickup device, the first signal and the second signal from each pixel of the sensor array consisting of plural pixels integrated in an array configuration on a semiconductor substrate are sequentially output as pixel outputs. This driving method for the solid-state image pickup device includes the following steps of operation: the first signal is stored in a memory arranged for each column of the pixels integrated in the array configuration; the first signal is input from the pixel to the memory and it is determined whether the first signal is selected as the pixel signal; when it is determined that the first signal is selected, the second signal is not output from the memory, and when it is determined that the second signal is selected, the second signal is uploaded to the memory; and the selected the first signal or the second signal is output as a pixel signal from the memory.

As a preferable scheme for the driving method for the solid-state image pickup device in the present invention, each pixel has a photodiode that receives light to generate photoelectric charge and stores the generated photoelectric charge, a transfer transistor that transfers the photoelectric charge from the photodiode, a floating diffusion that transfers the photoelectric charge through the transfer transistor, an accumulating capacitive element, which is arranged connected to the photodiode via the transfer transistor and which works in an accumulating operation so that the photoelectric charge flowing out from the photodiode is at least accumulated in it via the transfer transistor, an accumulating transistor, which couples or separates the floating diffusion and the potential of the accumulating capacitive element, and which has one source/drain region as the floating diffusion and connects the other source/drain region to the accumulating capacitive element, and an amplification transistor having a gate electrode connected to the floating diffusion; when the accumulating transistor is turned off, a signal corresponding to the signal charge accumulated in the floating diffusion is output as the first signal, and when the accumulating transistor is turned on, a signal corresponding to the signal charge accumulated in the floating diffusion and the accumulating capacitive element is output as the second signal.

As a preferable scheme for the driving method for the solid-state image pickup device of the present invention, in the step for determination whether the first signal is selected as the pixel signal, the first signal is compared with a prescribed threshold; and if the first signal is below the prescribed threshold, the first signal is selected, and if the first signal is above the threshold, the second signal is selected.

As a preferable scheme for the driving method for the solid-state image pickup device of the present invention, in the step for determining whether the first signal is selected as the pixel signal, a selection bit is generated that indicates which of the first signal and the second signal is selected, and the selection bit is output.

As a preferable scheme for the driving method for the solid-state image pickup device of the present invention, the pixel has a reset transistor that is connected to the accumulating capacitive element or the floating diffusion, and it exhausts the photoelectric charge in the accumulating capacitive element and/or the floating diffusion.

As a preferable scheme for the driving method for the solid-state image pickup device of the present invention, the pixel is connected in series with the amplification transistor, has a gate electrode for the selecting transistor and has a selecting transistor for selecting the pixel.

BRIEF DESCRIPTION OF THE DRAWINGS

These and other aspects of this invention are illustrated in the drawings, in which.

DETAILED DESCRIPTION OF PREFERRED EMBODIMENTS

SA represents a sensor array; M, M1 and M2 represent analog memories; N1, NS1, N2 and NS2 represent signals; Tr1 represents a transfer transistor; Tr2 represents an accumulating transistor; Tr3 represents a reset transistor; Tr4 represents an amplification transistor; Tr5 represents a selecting transistor; FD represents a floating diffusion; PD represents a photodiode; $C_S$ represents an accumulating capacitive element; SL ($\phi_X$) represents a selecting line; $\phi_T$, $\phi_S$, $\phi_R$, $\phi_1$, $\phi_2\phi_3$ represent driving lines; VOUT represents an output (line); VR represents a power supply voltage; Pixel represents a pixel; $SR^H$ represents a column shift register; $SR^V$ represents a row shift register; CAP, $C_1$ and $C_2$ represent capacitors; PC represents a pixel column; DC represents a signal determination circuit; SS represents a signal-selecting signal; SB represents a selection bit; $SW_{NS}$ and $SW_N$ represent switches; $C_{FD}$ and $C_{PD}$ represents capacitances; E represents an arithmetic and logic operation circuit; Vref, $V_{ref1}$, $V_{ref2}$, $V_{ref\_N1}$ and $V_{ref\_NS1}$ represent reference voltages; OC represents a last comparison; NC represents a new comparison; LT represents a latch; DIF represents a differential circuit; $R_{S1}$ represents a region under threshold; $R_{S2}$ represents a region over threshold; represents a region where signal S1 decreases; and ST1-ST8, ST11-ST16 represent steps of operation.

Embodiments of the solid-state image pickup device and its driving method of the present invention will be explained with reference to the Figures.

According to the solid-state image pickup device of the present invention, for a solid-state image pickup device with a wide dynamic range, which of signal S1 and signal S2 is used is determined, and when it is determined that the first signal is selected, the second signal is discarded, and, when it is determined that the second signal is selected, the second signal is uploaded to the memory; as a result, the same circuit can be used to work as both a circuit for signal S1 and a circuit for signal S2, and the device can be miniaturized.

According to the driving method for the solid-state image pickup device of the present invention, when the solid-state image pickup device with a wider dynamic range is driven, after signal S1 is stored in the memory, which of signal S1 and signal S2 is used is determined. When it is determined that the first signal is selected, the second signal is discarded, and, when it is determined that the second signal is selected, the second signal is uploaded to the memory, so that the same circuit can be used for both a circuit for signal S1 and a circuit for signal S2, and the device can be miniaturized.

Embodiment 1

The solid-state image pickup device of the present embodiment is a CMOS image sensor.

Figure 1:
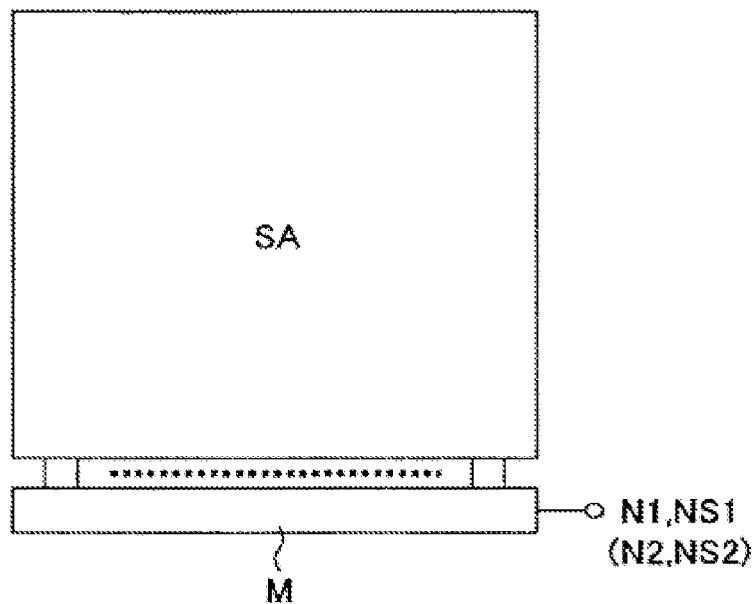
FIG. 1 illustrates the CMOS image sensor of Embodiment 1 of the present invention.

FIG. 1 is a schematic diagram illustrating the CMOS image sensor of the present embodiment. The CMOS image sensor of the present embodiment has a wider dynamic range. That is, as will be explained later, the construction is such that the photoelectric charge flowing out from the photodiode of each pixel is accumulated in a floating diffusion and an electrostatic capacitive element. As the signal of each pixel, when photoelectrons are not flowing out from the photodiode, signal S1 is read from the photoelectrons in the photodiode, and, when photoelectrons are flowing out, the photoelectrons in the photodiode and the photoelectrons flowing out from the photodiode are merged to read signal S2.

Analog memory M is arranged and connected to each line of the array with respect to sensor array SA where plural pixels are integrated in an array configuration to form a light-receiving surface.

In the analog memory M, two capacitors are arranged for each line. Signal N1 as the noise level corresponding to the signal S1 and signal NS1 (corresponding to N1-S1) as the difference between signal N1 and signal S1 are stored in the two capacitors of analog memory M, and they are then output.

In addition, in analog memory M, from each pixel, signal N2 as the noise level corresponding to the signal S2 and signal NS2 (corresponding to N2-S2) of the difference between signal N2 and signal S2 are uploaded to the two capacitors of analog memory M.

For the CMOS image sensor in the embodiment, as will be explained later, a pixel has a construction to ensure that signal S1 (first signal) and signal S2 (second signal) are sequentially output as pixel outputs.

An analog memory is arranged for each column of the pixels integrated in the array configuration, and a signal determination circuit is arranged and connected to the analog memory.

For the signal determination circuit, when signal S1 is input from the pixel to the analog memory, it is determined that signal S1 can be used. When it is determined that signal S1 is selected, signal S2 is discarded and it is not output to the memory, and, when it is determined that signal S2 is selected, signal S2 is uploaded to the analog memory.

Figure 2:
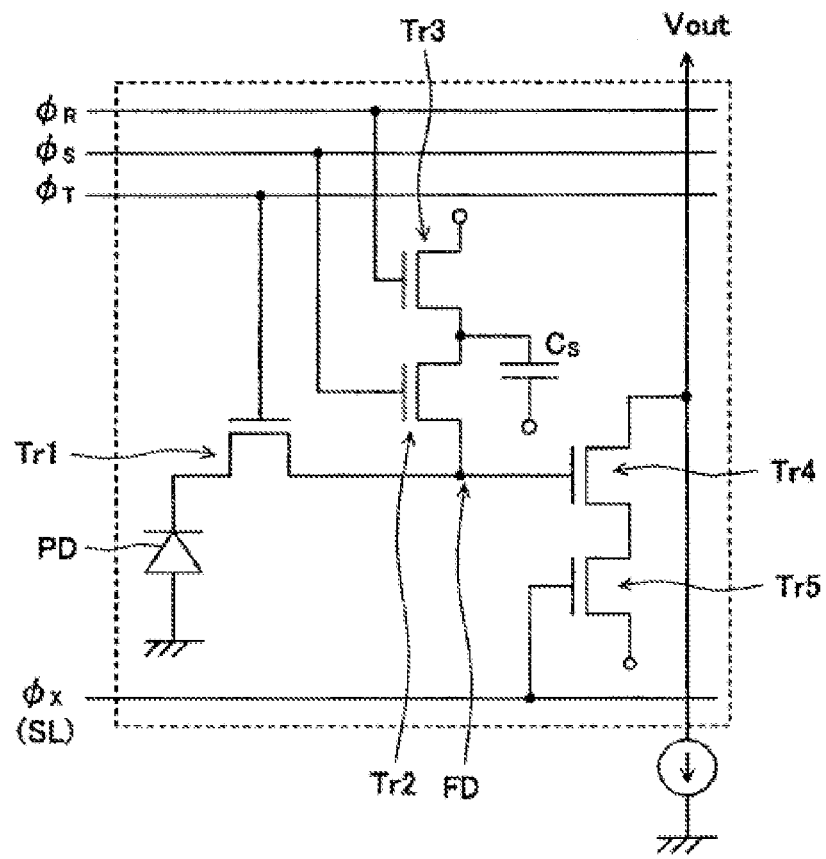
FIG. 2 is an equivalent circuit diagram illustrating one pixel (pixel) PX that forms the CMOS image sensor in Embodiment 1 of the present invention.

FIG. 2 is an equivalent circuit diagram illustrating one pixel (Pixel) PX that forms the CMOS image sensor.

Each pixel is composed of the following parts: photodiode PD that receives light to generate photoelectric charge and stores the generated photoelectric charge, transfer transistor Tr1 that transfers the photoelectric charge from the photodiode PD, floating diffusion FD that transfers the photoelectric charge through the transfer transistor Tr1, accumulating capacitive element $C_S$ that accumulates photoelectric charge flowing out from the photodiode in an accumulating operation, accumulating transistor Tr2, which couples or separates the floating diffusion FD and the potential of the accumulating capacitive element $C_S$, reset transistor Tr3, which is arranged connected to floating diffusion FD via the accumulating transistor and which exhausts the photoelectric charge in floating diffusion FD, accumulating transistor (source follower) Tr4 that amplifies and converts the photoelectric charge in floating diffusion FD to a voltage signal, and selecting transistor Tr5, which is formed connected to the source follower and selects the pixel. This is a so-called 5-transistor-type CMOS image sensor. For example, all of the five transistors may be n-channel MOS transistors.

In this embodiment, the CMOS image sensor has pixels with the construction integrated in an array configuration. Each pixel has various driving lines ($\phi_T$, $\phi_S$, $\phi_R$) connected to the gate electrodes of transfer transistor Tr1, accumulating transistor Tr2 and reset transistor Tr3. Pixel selecting line SL ($\phi_X$) driven by a row shift register is connected to the gate electrode of selecting transistor Tr5. In addition, pixel output line Vout is connected to the source/drain on the output side of amplification transistor Tr4, and it is controlled by a column shift register to perform output. From the pixel output line Vout, the four signals (signal N1, signal NS1, signal N2 and signal NS2) are output in a sequence to be explained later.

For selecting transistor Tr5 and driving line $\phi_X$, it is only necessary that the voltage of floating diffusion FD be fixed at an appropriate value so that a pixel may or may not be selected can be performed. Consequently, they may be omitted.

Figure 3:
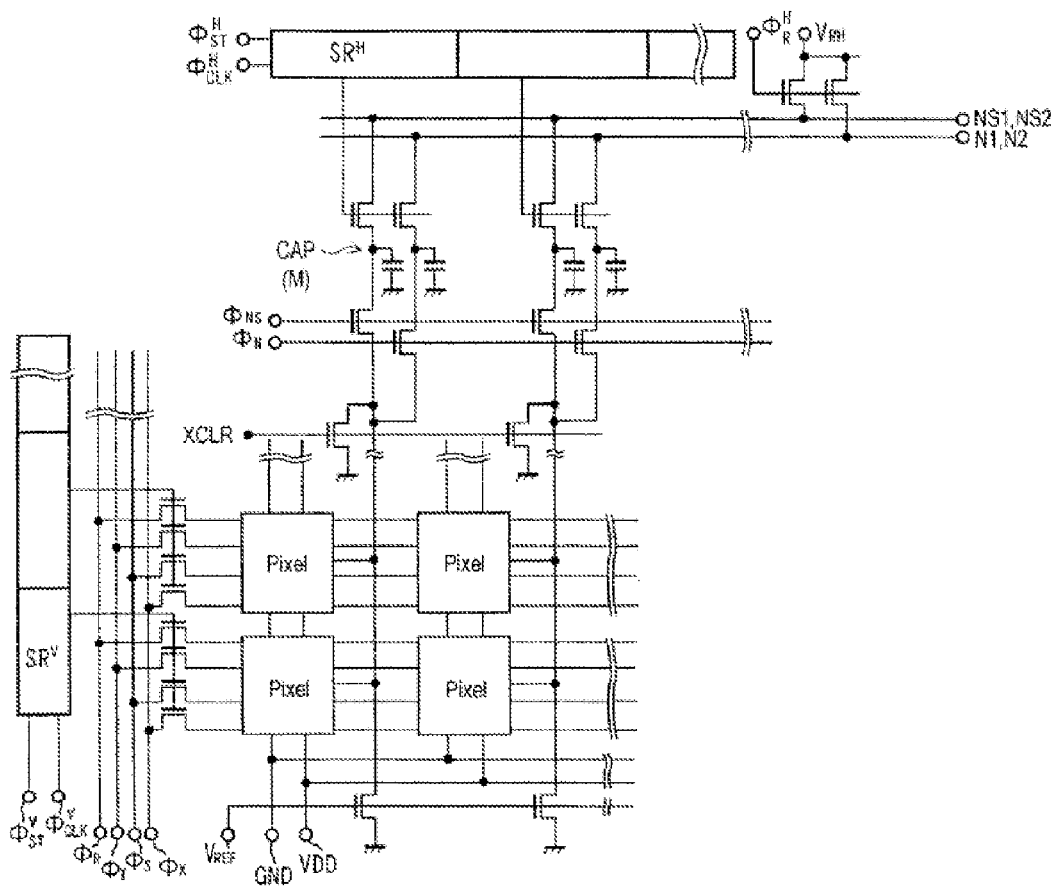
FIG. 3 is an equivalent circuit diagram illustrating the construction of the circuit of the portion including the sensor array, analog memory and the output system of the CMOS image sensor in Embodiment 1 of the present invention.

FIG. 3 is an equivalent circuit diagram illustrating the circuit construction of the portion of the sensor array and analog memory as well as their output system of the CMOS image sensor in the present embodiment.

A plurality (four in the example shown in the figure as an example) of pixels (Pixels) are arranged in an array configuration, and, connected to each pixel (Pixel) are the driving lines ($\phi_T$, $\phi_S$, $\phi_R$, $\phi_X$) controlled by row shift register $SR^V$ as well as power supply VDD and ground GND, etc.

Under control of column shift register $SR^H$ and driving lines ($\phi_{NS1}$, $\phi_{N1}$) from each pixel (Pixel), the signal N1 and signal NS1 are stored in analog memory M having capacitors CAP with a construction that can be cleared by driving line $\phi_{XCLR}$ and they are then output.

The signal N1 and signal NS1 are input to the signal determination circuit, and whether signal S1 can be used is determined. When it is determined that signal S1 is selected, signal S2 is discarded and not output to the memory, and when it is determined that signal S2 is selected, from each pixel (Pixel), under control of the column shift register $SR^H$ and driving lines ($\phi_{NS2}$, $\phi_{N2}$), signal N2 and signal NS2 are uploaded to analog memory M where signal N1 and signal NS1 are stored, and signal N1 and signal NS1 can output from the same output line in this construction.

Figure 4:
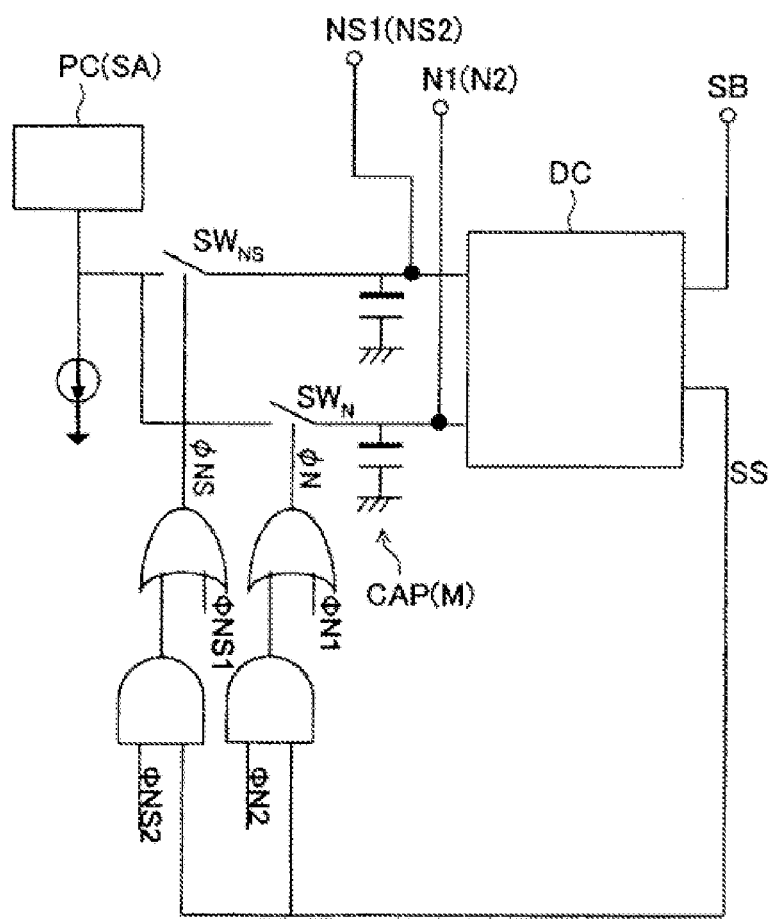
FIG. 4 illustrates the construction of the portion of the pixel column PC that forms the sensor array, as well as the analog memory and their output systems in the CMOS image sensor in Embodiment 1 of the present invention.

FIG. 4 is a schematic diagram illustrating the construction of the portion of the pixel column PC, the analog memory as well as their output systems that form the sensor array of the CMOS image sensor in the present embodiment.

The analog memory M having capacitor CAP is connected to each pixel column PC that forms sensor array SA. Here, switch $SW_{NS}$ and switch $SW_N$ are arranged between pixel column PC and analog memory M. The output line of analog memory M is connected to the output lines of the signal NS1 and signal N1 or signal NS2 and signal N2, and, at the same time, signal determination circuit DC is connected to them. From signal determination circuit DC, signal-selecting signal SS and selection bit SB are output.

The signal-selecting signal SS is input to a circuit that generates a signal for controlling driving lines ($\phi_{NS}$, $\phi_N$). The circuit for generating the signal for controlling driving lines ($\phi_{NS}$, $\phi_N$) consists of driving lines ($\phi_{NS1}$, $\phi_{N1}$, $\phi_{N2}$) and an AND circuit and OR circuit with signal-selecting signal SS input to them.

First, when driving lines ($\phi_{NS1}$, $\phi_{N1}$) become High, driving lines ($\phi_{NS}$, $\phi_N$) become High, switch $SW_{NS}$ and switch $SW_N$ are turned on, and signal NS1 and signal N1 of the pixel selected from pixel column PC are stored in analog memory M. In addition, signal NS1 and signal N1 are input to signal determination circuit DC.

The signal determination circuit DC determines whether signal NS1 and signal S1 obtained from signal NS1 can be used as the pixel signal. The determination result is output as signal-selecting signal SS. Here, signal-selecting signal SS may be a High/Low signal, +/− signal, or 1/0 signal or the like.

When it is determined that signal S1 can be used as the pixel signal, the signal-selecting signal SS is a Low signal, − signal or 0. When driving lines ($\phi_{NS2}$, $\phi_{N2}$) become High while driving lines ($\phi_{NS}$, $\phi_N$) are already Low, switch $SW_{NS}$ and switch $SW_N$ do not turn on. As a result, signal NS2 and signal N2 are discarded.

When it is determined that signal S2 should be used because signal S1 cannot be used as the pixel signal, signal-selecting signal SS is a High signal, + signal, or 1. When driving lines ($\phi_{NS2}$, $\phi_{N2}$) become High, driving lines ($\phi_{NS}$, $\phi_N$) become High again, switch $SW_{NS}$ and switch $SW_N$ are turned on, and signal NS2 and signal N2 selected from pixel column PC are uploaded to analog memory M.

As explained above, from the data stored in analog memory M, for each pixel, signal NS1 and signal N1, or signal NS2 and signal N2 are output. They are input to a correlation double-sampling circuit (CDS circuit) that carries out an arithmetic and logic operation to determine the difference, and signal S1 or signal S2 is obtained.

The signal S1 or signal S2 is converted to digital data by an A/D converter, and the obtained digital data are output to a circuit formed on the outside.

The selection bit SB is 0 when signal S1 is in use and it is 1 when signal S2 is in use. In this case, selection bit SB may be output as a higher-order bit of the digital data.

As another scheme, for example, after amplification of signal S1 or signal S2 with a gain preset corresponding to selection bit SB (0 or 1), the signal is converted to digital data by means of an A/D converter, and the digital data are output to a circuit formed on the outside.

The gain may be set corresponding to a charge distribution ratio represented by $\alpha = C_{FD}/(C_{FD}+C_S)$. Here, $C_{FD}$ and $C_S$ represent the capacitances of the floating diffusion and the accumulating capacitive element, respectively.

For example, when signal-selecting signal SS is a signal of 1 and 0, the output of selection bit SB may be taken as the same signal as signal-selecting signal SS.

In the following, the driving method of the CMOS image sensor of the present embodiment will be explained.

Figure 5:
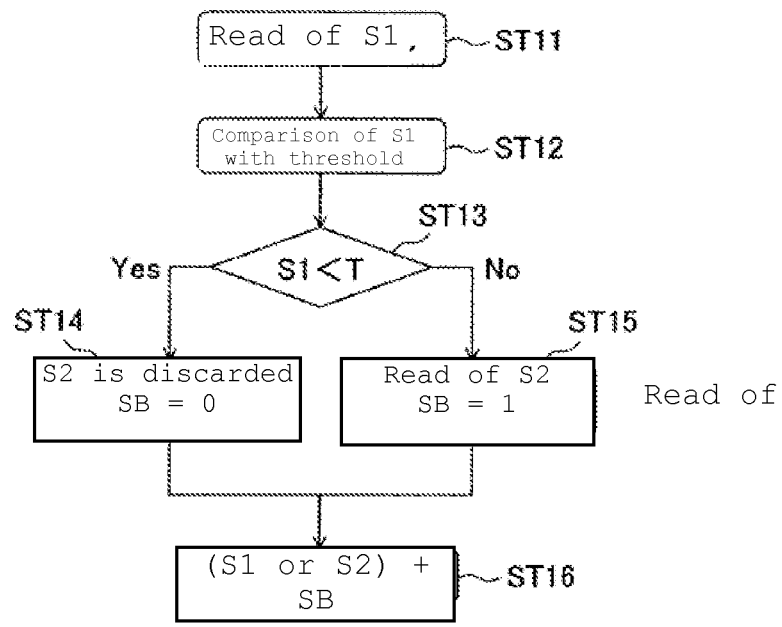
FIG. 5 is a flow chart of the operation of the CMOS image sensor in Embodiment 1 of the present invention.

FIG. 5 is a flow chart illustrating the operation of the CMOS image sensor in this embodiment. These steps of operation are carried out for each line.

First, as first step ST11, signal S1 is read. For example, the signal NS1 and signal N1 are read into analog memory M, and an arithmetic and logic operation is carried out to determine their difference.

Then, as second step ST12, signal S1 is checked for each pixel. That is, as shown in the third step ST13, signal S1 is compared with a prescribed threshold T. For example, when S1<T the determination is YES, and when S1>T the determination is NO.

When signal S1 is lower than threshold T, as shown in the fourth step ST14, signal S2 is discarded, selection bit SB is set at 0, and signal S1 is used as the pixel signal. When signal S1 is over threshold T, as shown in the fifth step ST15, signal S2 is read, selection bit SB is set at 1, and signal S2 is used as the pixel signal. For example, the signal NS2 signal and signal N2 are read into analog memory M, and the data of analog memory M are uploaded, and an arithmetic and logic operation is carried out to determine their difference in order to obtain signal S2.

The data obtained from signal S1 and signal S2 in the aforementioned operation and selection bit SB are merged, and, as the sixth step ST16, a signal corresponding to the output of each pixel is generated. Here, as explained above, the selection bit may be taken as the higher-order bit of the digital data, and signal S1 or signal S2 can be amplified corresponding to the selection bit to obtain a signal corresponding to the output of each pixel.

One may adopt a scheme in which as the first step ST11, instead of signal S1, signal NS1 and signal N1 signal are adopted as is, as will be explained later.

In this case, as the second step ST12, signal NS1 and signal N1 signal are used as is, and the various pixels that can use signal S1 are checked. In the third step ST13, signal NS1 and signal N1 are used to determine whether signal S1 can be used (YES) or cannot be used (NO).

The aforementioned steps of operation are then repeated for all pixels.

As explained above, the CMOS image sensor in this embodiment can be driven.

In the following, the method for acquiring the signal NS1, signal N1, signal NS2 and signal N2 will be explained.

Figure 6:
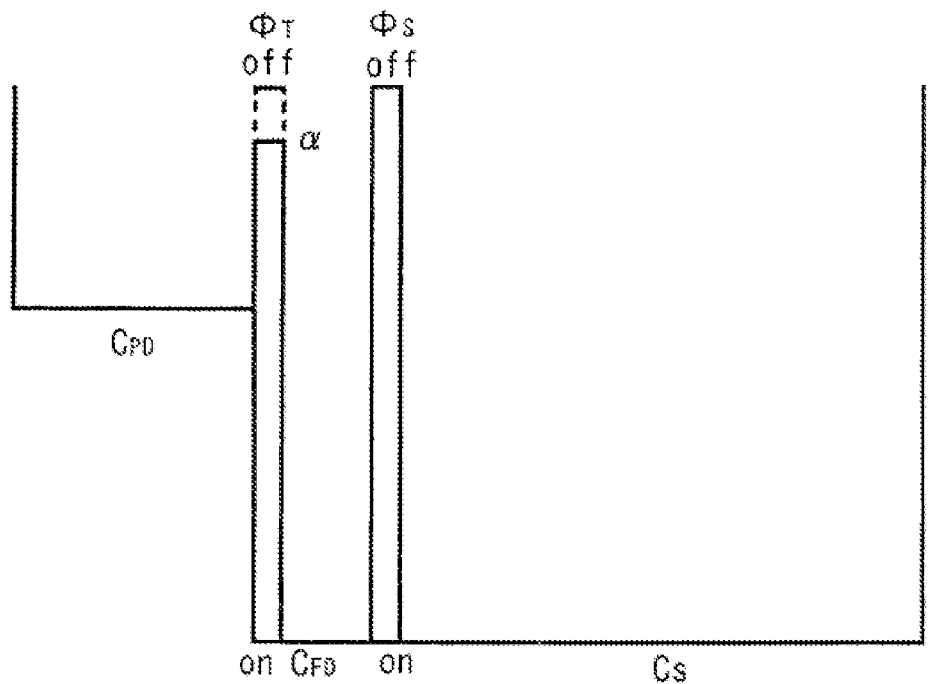
FIG. 6 is a schematic potential diagram of the CMOS image sensor in Embodiment 1 of the present invention.

FIG. 6 is a schematic potential diagram illustrating the CMOS image sensor in the present embodiment. It corresponds to photodiode PD, transfer transistor Tr1, floating diffusion FD, accumulating transistor Tr2 and accumulating capacitive element Cs.

The photodiode PD forms capacitance $C_{PD}$ with a relatively shallow potential, and floating diffusion FD and accumulating capacitive element $C_S$ form capacitances ($C_{FD}$, $C_S$) with a relatively deep potential.

Here, transfer transistor Tr1 and accumulating transistor Tr2 assume the two levels corresponding to on/off of the transistors.

In the following, the method for driving the CMOS image sensor in the present embodiment will be explained with reference to the equivalent circuit diagram shown in FIG. 2 and the potential diagram shown in FIG. 6.

Figure 7:
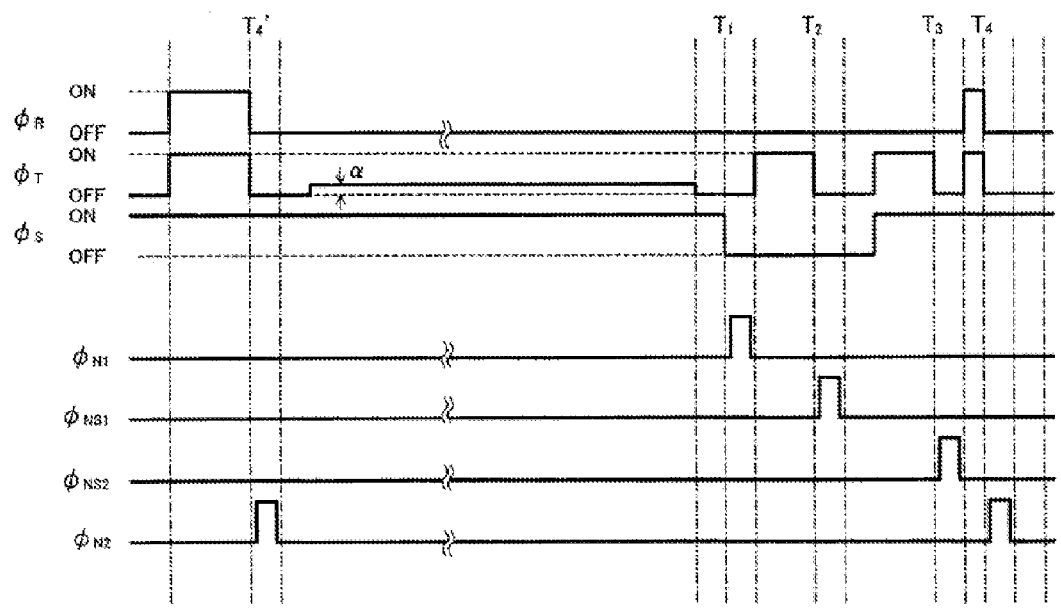
FIG. 7 is a time chart of the voltage applied on the driving line of the CMOS image sensor in Embodiment 1 of the present invention.

FIG. 7 is a time chart illustrating the voltages applied on the driving lines of the CMOS image sensor in the present embodiment. The voltages applied on driving lines ($\phi_T$, $\phi_S$, $\phi_R$) have two levels, on and off, and $\phi_T$ has the level indicated by the (+α), so it has three levels.

The voltage applied on driving line $\phi_T$ may have two levels, that is, on level and (+α) level. However, as shown in the present example, the scheme for three levels can result in a higher maximum signal voltage at floating diffusion FD. When $\phi_T$ is driven with two levels, the off level shown in FIG. 7 may be taken as the (+α) level.

FIGS. 8(A) to 8(G) correspond to diagrams of potential at various times on the time chart.

First, at the start of a field, while $\phi_S$ is on, $\phi_T$ and $\phi_R$ are turned on, and the photoelectric charge generated in the preceding field is entirely exhausted and reset, $\phi_T$, $\phi_R$ are turned off. Here, $\phi_T$ is set at an appropriate level (+α).

Figure 8:
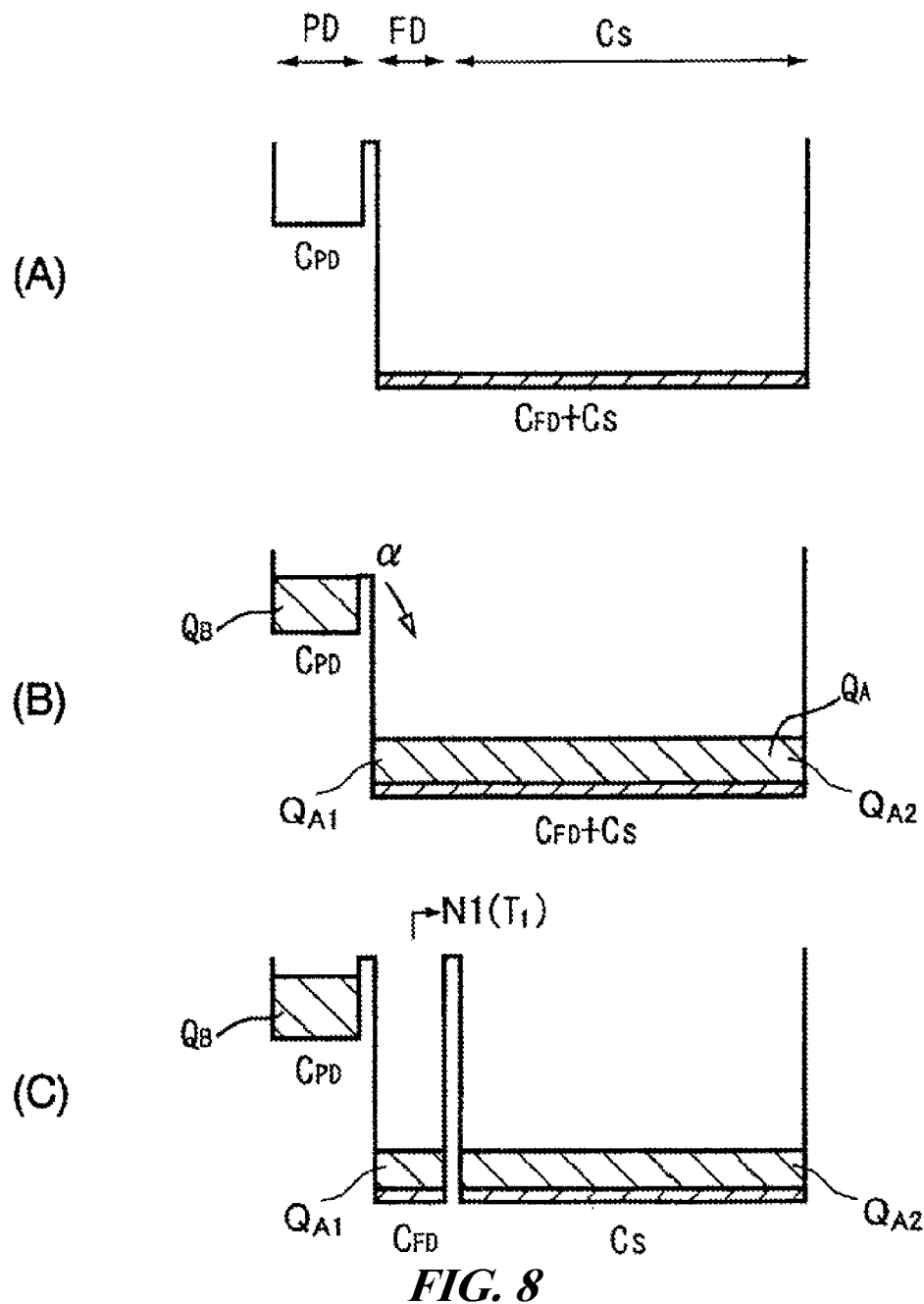
FIGS. 8 (A) to 8 (G) are potential diagrams at various times of the time chart of FIG. 7.
Figure 8:
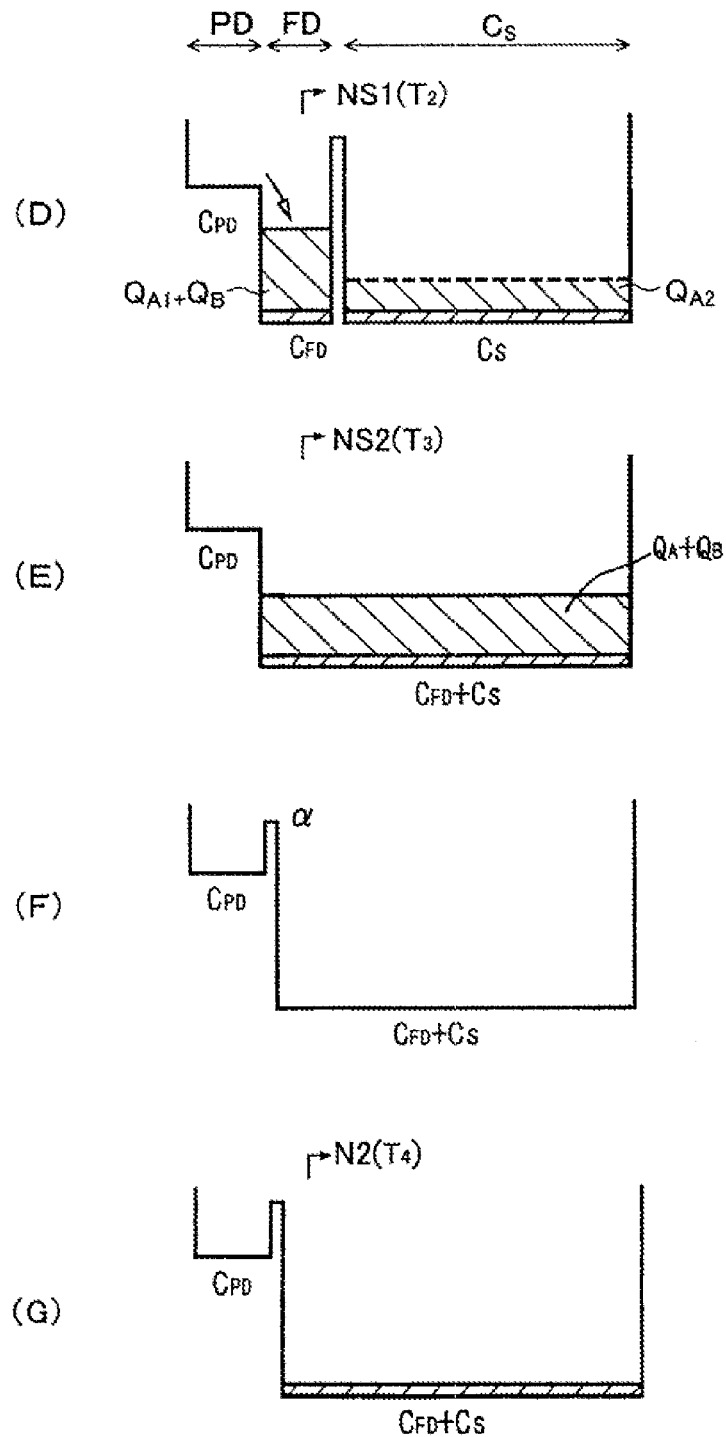

In this case, as shown in FIG. 8(A), $\phi_S$ is turned on, so that $C_{FD}$ and $C_S$ are coupled to each other, and, immediately after reset, along with the reset operation, so-called kTC noise is generated at $C_{FD}$, $C_S$.

During an accumulation time starting with $\phi_R$ off, the photoelectric charge generated in photodiode PD accumulates. In this case, for $\phi_T$ at the level of (+α), the barrier between $C_{PD}$ and $C_{FD}$ decreases a little.

When accumulation of charge starts, first, photoelectric charge is accumulated in $C_{PD}$, and, when the photoelectron quantity exceeds that for saturation of $C_{PD}$, as shown in FIG. 8(B), $\phi_T$ is at the level of (+α), so the photoelectric charge rises above the barrier that is a little lower, and it flows out from $C_{PD}$. It is selectively accumulated in the $C_{FD}+C_S$ of the pixel.

In this way, when the quantity of photoelectrons is less than that for saturation of photodiode PD, photoelectric charge accumulates only in $C_{PD}$, and, when the quantity of the photoelectrons exceeds that for saturation of photodiode PD, in addition to $C_{PD}$, photoelectric charge accumulates in $C_{FD}$ and $C_S$.

FIG. 8(B) is a diagram illustrating a state in which $C_{PD}$ is saturated, under-saturated charge $Q_B$ is accumulated in $C_{PD}$, and over-saturated charge $Q_A$ is accumulated in $C_{FD}$ and $C_S$.

Then, $\phi_T$ returns to the off state from the level of (+α). Then, at time $T_1$, $\phi_S$ is turned off, and, as shown in FIG. 8(C), the potentials of $C_{FD}$ and $C_S$ are divided. In this case, corresponding to the ratio of the capacitances of $C_{FD}$ and $C_S$, the over-saturated charge $Q_A$ is divided into $Q_{A1}$ and $Q_{A2}$. Here, $\phi_{N1}$ is turned on, and a signal on the level of $C_{FD}$ that holds a portion $Q_{A1}$ of the over-saturated charge is read as signal N1, which is the noise signal.

Then, $\phi_T$ is turned on, and, as shown in FIG. 8(D), under-saturated charge $Q_B$ in $C_{PD}$ is transferred to $C_{FD}$, and it is mixed with a portion $Q_{A1}$ of the over-saturated charge that is held in $C_{FD}$.

Here, because the potential of $C_{PD}$ is shallower than that of $C_{FD}$, and the level of the transfer transistor is deeper than that of $C_{PD}$, all of under-saturated charge $Q_B$ in $C_{PD}$ can be fully transferred to $C_{FD}$.

Then, at time $T_2$, $\phi_T$ is returned to the off state, and $\phi_{NS1}$ is turned on. From the under-saturated charge $Q_B$ transferred to $C_{FD}$, signal S1 is read as an under-saturated charge. Here, a charge as the sum of under-saturated charge $Q_B$ and a portion $Q_{A1}$ of the over-saturated charge is present in $C_{FD}$, and the signal actually read is signal NS1 (N1-S1). FIG. 8(D) shows the state before $\phi_T$ is turned off.

Then, as $\phi$hd S and $\phi_T$ are turned on, the potentials of $C_{FD}$ and $C_S$ are combined, and, as shown in FIG. 8(E), a charge as the sum of under-saturated charge $Q_B$ and a portion $Q_{A1}$ of over-saturated charge in $C_{FD}$ and a portion $Q_{A2}$ of over-saturated charge in $C_S$ are combined. Because the sum of a portion $Q_{A1}$ of over-saturated charge and a portion $Q_{A2}$ of over-saturated charge corresponds to over-saturated charge $Q_A$ before dividing, in this state, the signal of the sum of over-saturated charge $Q_A$ and under-saturated charge $Q_B$ is held in the potential as a combination of $C_{FD}$ and $C_S$.

Here, at time $T_3$, $\phi_T$ returns to the off state, $\phi_{NS2}$ is turned on, and, from the sum of under-saturated charge $Q_B$ spread in $C_{FD}+C_S$ and over-saturated charge $Q_A$, signal S2 corresponding to the sum of the over-saturated charge signal and under-saturated charge signal is read. Here, the $C_{FD}+C_S$ noise rises on the signal, and the signal actually read becomes signal NS2 (N2-S2). FIG. 8(E) shows the state before $\phi_T$ returns to the off state.

The operation for one field comes to an end as mentioned previously. Then, as the operation moves to the next field, $\phi_S$ is turned on, while $\phi_T$, $\phi_R$ are turned on, and, as shown in FIG. 8(F), all photoelectric charge generated in the preceding field is exhausted, followed by resetting.

Then, at time $T_4$, as shown in FIG. 8(G), $\phi_S$ is turned on, and, while $C_{FD}$ and $C_S$ are combined, $\phi_R$ is turned off, $\phi_{N2}$ is turned on, and signal N2 is read as kTC noise generated at $C_{FD}+C_S$.

As explained above, from the signal NS1, signal N1, signal NS2 and signal N2, the signal S1 or signal S2 and selection bit SB are obtained for each pixel, so that a CMOS image sensor corresponding to a wide dynamic range can be realized.

For the solid-state image pickup device of this embodiment, in a solid-state image pickup device with a wider dynamic range, it is determined which of signal S1 and signal S2 is in use. When it is determined that the first signal is selected, the second signal is discarded. When it is determined that the second signal is selected, the second signal is uploaded to the memory, so the same circuit can be used as both a circuit for signal S1 and a circuit for signal S2. As a result, the device can be miniaturized.

For the driving method for the solid-state image pickup device of the present embodiment, when the solid-state image pickup device with a wider dynamic range is driven, signal S1 is stored in the memory, and which of signal S1 and signal S2 is for use is determined. When it is determined that the first signal is selected, the second signal is discarded. When it is determined that the second signal is selected, the second signal is uploaded to the memory, so the same circuit can be used as both the circuit for signal S1 and the circuit for signal S2. As a result, the device can be miniaturized.

Embodiment 2

Figure 9:
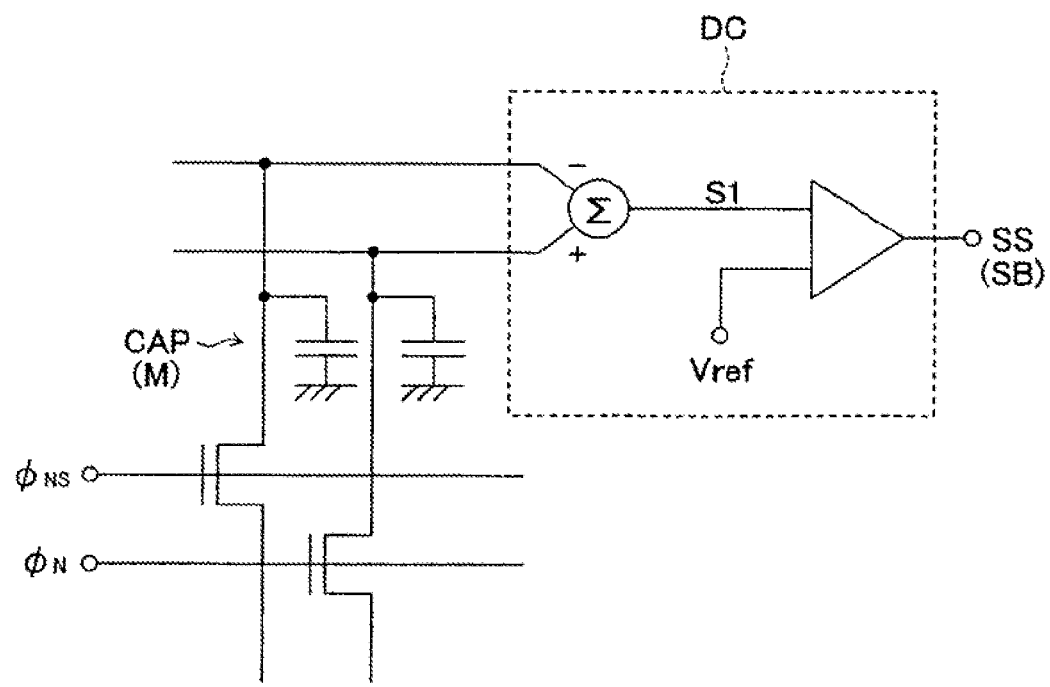
FIG. 9 is an equivalent circuit diagram illustrating the circuit construction of the portion of the analog memory and output system of the CMOS image sensor of Embodiment 2 of the present invention.

FIG. 9 is a diagram illustrating a more specific construction of signal determination circuit DC. It is an equivalent circuit diagram illustrating the circuit construction of the analog memory and output system of the CMOS image sensor in this embodiment.

Analog memory M having capacitor CAP is connected to each pixel column. The output column of analog memory M is connected to signal determination circuit DC, and signal-selecting signal SS is output. Selection bit SB is output from signal determination circuit DC.

The output line of the analog memory M is connected to the output lines of signal NS1 and signal N1 or signal NS2 and signal N2, not shown in the figure.

The signal determination circuit DC has arithmetic and logic operation circuit $\Sigma$ that computes signal S1 (N1-NS1) from signal NS1 and signal N1, and it compares signal S1 with reference voltage Vref, and determines whether signal S1 can be used as the pixel signal. The determination result is output as signal-selecting signal SS. Here, signal-selecting signal SS may be a High/Low signal, +/- signal, or 1/0 signal or the like.

For example, when signal-selecting signal SS is a 1/0 signal, the output of selection bit SB may be taken as a signal identical to signal-selecting signal SS.

Just like in Embodiment 1, for the solid-state image pickup device of this embodiment, in a solid-state image pickup device with a wider dynamic range, it is determined which of signal S1 and signal S2 is in use. When it is determined that the first signal is selected, the second signal is discarded. When it is determined that the second signal is selected, the second signal is uploaded to a memory, so that the same circuit can be used as both a circuit for signal S1 and a circuit for signal S2. As a result, the device can be miniaturized.

The driving method for the solid-state image pickup device of this embodiment works just like that in Embodiment 1. Because the same circuit can function as both a circuit for signal S1 and a circuit for signal S2, the device can be miniaturized.

Embodiment 3

Figure 10:
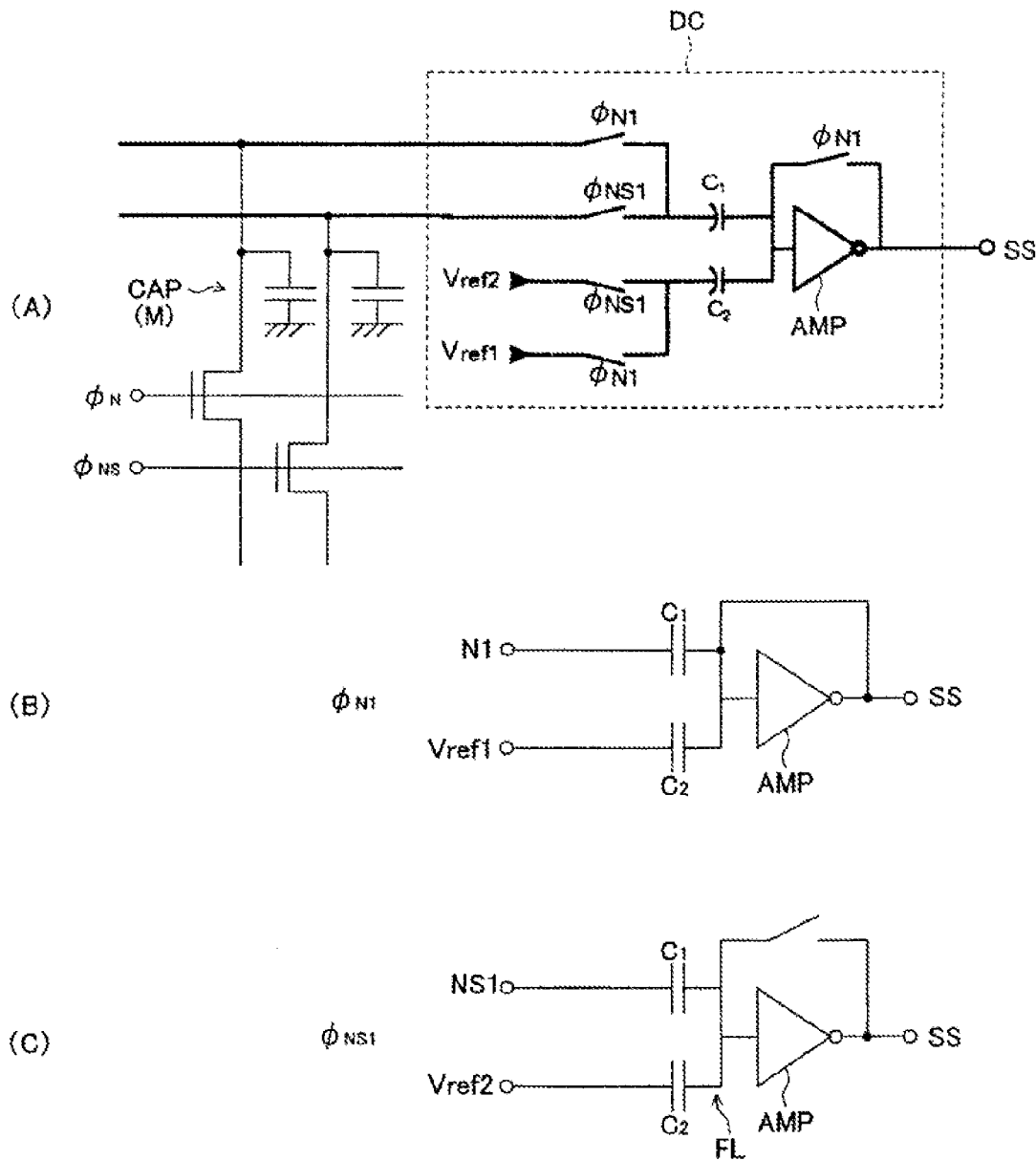
FIG. 10(A) is an equivalent circuit diagram of the circuit construction of the portion of the analog memory and output system of the CMOS image sensor in Embodiment 3 of the present invention.
FIGS. 10(B) and 10(C) are equivalent circuit diagrams of the circuit construction corresponding to on/off of each driving line.

FIG. 10(A) is a diagram illustrating a more specific construction of signal determination circuit DC. It is an equivalent circuit diagram illustrating the circuit construction of the analog memory and output system of the CMOS image sensor in this embodiment. FIGS. 10(B) and 10(C) are equivalent circuit diagrams illustrating circuit constructions corresponding to on/off of the various driving lines.

Analog memory M having capacitor CAP is connected to each pixel column. The output column of analog memory M is connected to signal determination circuit DC, and signal-selecting signal SS is output.

The output line of the analog memory M is connected to the output lines of signal NS1 and signal N1, or signal NS2 and signal N2, not shown in the figure.

Signal determination circuit DC consists of five switches for on/off of the driving lines ($\phi_{NS1}$, $\phi_{N1}$), two capacitors ($C_1$, $C_2$) and amplifier AMP.

Output lines of analog memory M are connected to capacitor $C_1$ via a switch turned on/off by drive lines ($\phi_{NS1}$, $\phi_{N1}$).

Here, the lines connected to two reference voltages $V_{ref1}$, $V_{ref2}$ are connected to capacitor $C_2$ via on/off switches in driving lines ($\phi_{NS1}$, $\phi_{N1}$).

The electrode on the other side of each of the capacitors ($C_1$, $C_2$) is connected to the input of amplifier AMP.

For amplifier AMP, a feedback line is arranged via a switch that is turned on/off by means of driving line ($\phi_{N1}$).

In the construction, when driving line ($\phi_{N1}$) is turned on, as shown in FIG. 10(B), the voltages applied on the electrodes on one side of two capacitors ($C_1$, $C_2$) become $V_{N1}$ and $V_{ref1}$, respectively. In this case, amplifier AMP has its output fed back.

In the construction, when the power supply voltage minus ground voltage of amplifier AMP becomes V, charge Q accumulated in the electrode on the other side of capacitor $C_1$ becomes ($V_{N1}$–V/2)·C, and the charge accumulated in the electrode on the other side of capacitor $C_2$ becomes ($V_{ref1}$–V/2)·C.

Then, driving line ($\phi_{N1}$) is turned off, and driving line ($\phi_{NS1}$) is turned on, and, as shown in FIG. 10(C), feedback of the output of amplifier AMP disappears, and the lines connected to the electrodes on the other side of capacitors ($C_1$, $C_2$) become floating FL. The voltages applied on the electrodes on the other side of two capacitors ($C_1$, $C_2$) become $V_{NS1}$ and $V_{ref2}$, respectively.

Here, during the period in which driving line $\phi_{N1}$ is on, the effects of the offset of the compensated amplifier AMP and parasitic capacitance that indicate no influence on the sign can be ignored. If the gain of amplifier AMP is high enough, the input voltage of amplifier AMP becomes about the equivalent voltage of $\Delta Vi = -[(N1-NS1)-(V_{ref1}-V_{ref2})] = -(S1-V_{ref})$.

In this case, the output of amplifier AMP responds to a rise in the input voltage, and obtains the result of comparison of S1 and $V_{ref}$. Here, corresponding to the potential of $\Delta Vi$ of + or –, the output of amplifier AMP becomes High or Low.

Mismatch between two capacitors ($C_1$, $C_2$) becomes a factor that is of different importance to the signal voltage and reference voltage. It is also related to selection of an appropriate value for the reference voltage.

The aforementioned comparison should be carried out during the period when signal NS1 is output. This means that a determination may not be correct because the time in which the level of signal S1 and the level of $V_{ref}$ are the same level is insufficient. However, in this embodiment, because the correctness is not high in seeking the determination, in the comparison with the threshold, some uncertainty can be tolerated.

Figure 11:
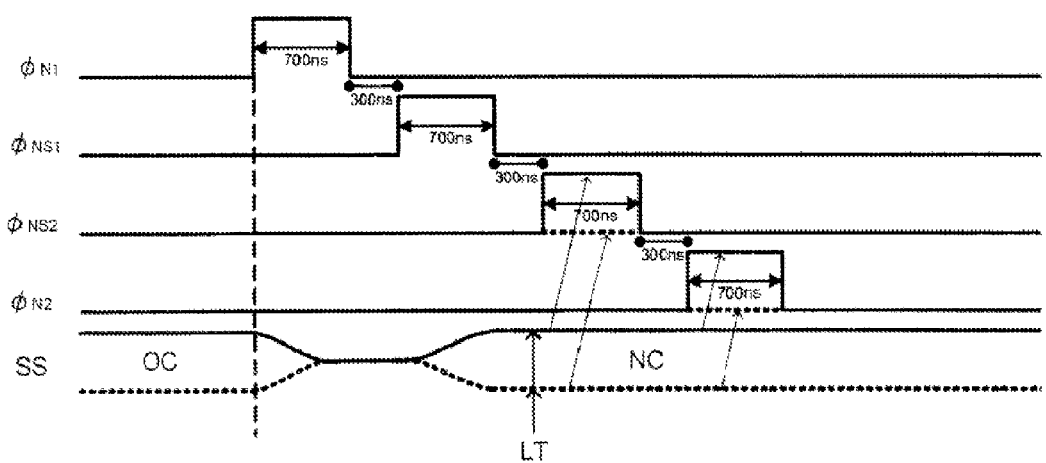
FIG. 11 is a time chart of the levels of the driving line and the signal selection signal of the CMOS image sensor in Embodiment 3 of the present invention.

FIG. 11 is a time chart illustrating the levels of the driving lines ($\phi_{N1}$, $\phi_{NS1}$, $\phi_{NS2}$, $\phi_{N2}$) of image sensor CMOS concerning this embodiment of the present invention and signal-selecting signal SS obtained by merging the driving lines.

For example, as the period when signal N1 is obtained, is High for 700 nS. For signal NS1, $\phi_{NS1}$ becomes High for 700 nS. The intervals between the High periods may be, e.g., 300 nS.

Then, just as mentioned previously, a period of 300 nS is created, and $\phi_{NS2}$ is High for 700 nS as the period for obtaining signal NS2, and a period of 300 nS is created, and $\phi_{N2}$ is High for 700 nS for obtaining signal N2.

Here, once the signal NS1 is obtained, the comparison is started immediately. When it is possible to determine a sufficient displacement of the voltage, signal-selecting signal SS is latched and output. Here, after obtaining signal NS1, it is necessary to determine the result and to latch before start of the period for obtaining signal NS2. By means of the obtained signal-selecting signal SS, it is determined whether signal NS1 and signal N1 should be kept in the analog memory or signal NS2 and signal N2 should be uploaded.

Signal-selecting signal SS holds the latched result in the last round of comparison (OC) until start of the period for obtaining signal N1, and, if signal NS1 is obtained and a new comparison (NC) result is obtained, it is latched (LT) before start of the period for obtaining signal NS2.

Just as in Embodiment 1, for the solid-state image pickup device of this embodiment, in a solid-state image pickup device with a wider dynamic range, it is determined which of signal S1 and signal S2 is in use. When it is determined that the first signal is selected, the second signal is discarded. When it is determined that the second signal is selected, the second signal is uploaded to the memory, so the same circuit can be used as both a circuit for signal S1 and a circuit for signal S2. As a result, the device can be miniaturized.

The driving method for the solid-state image pickup device of this embodiment works just like that in Embodiment 1. Because the same circuit can be used to work as both a circuit for signal S1 and a circuit for signal S2, the device can be miniaturized.

Embodiment 4

Figure 12:
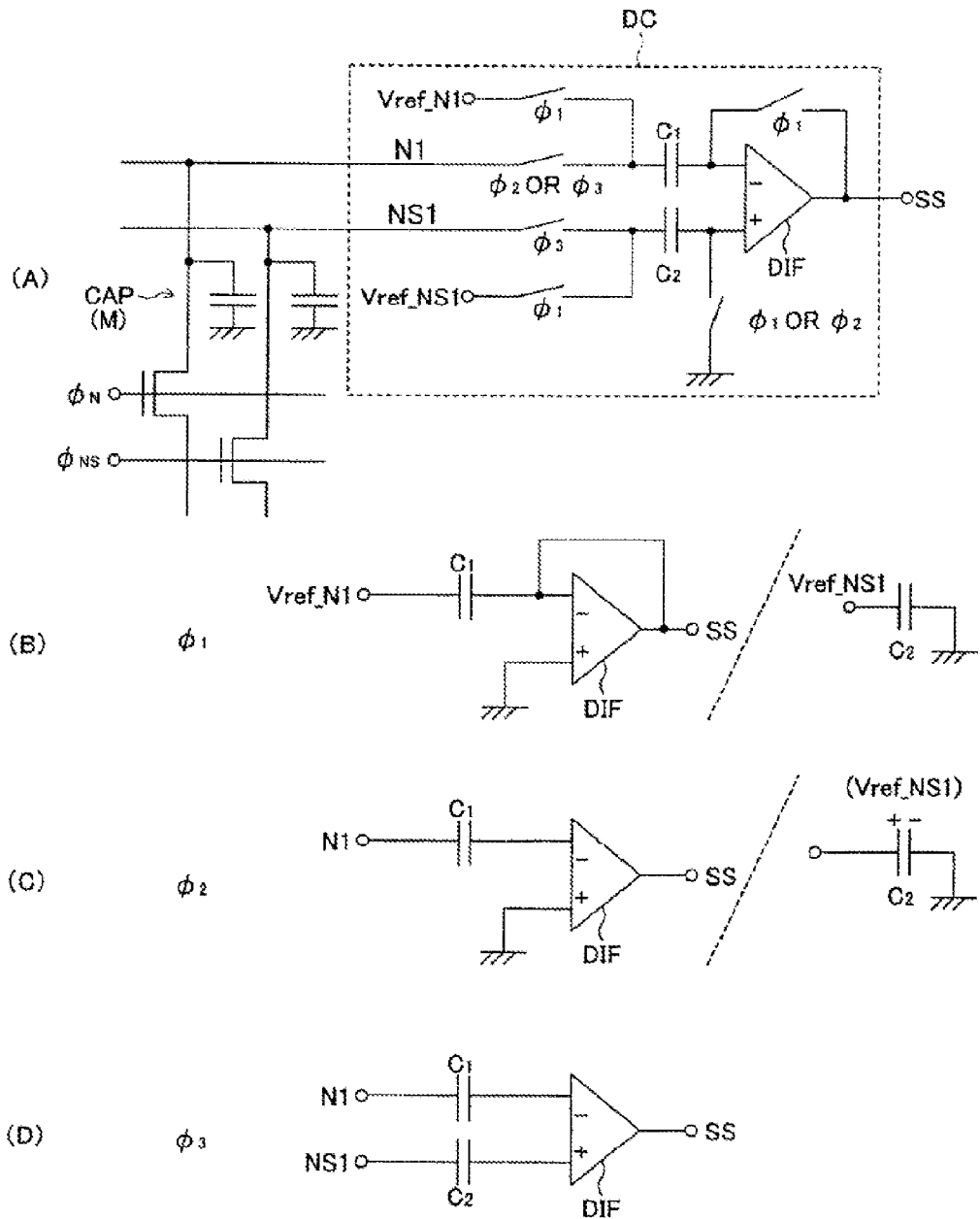
FIG. 12(A) is an equivalent circuit diagram of the circuit construction of the portion of the analog memory and output system of the CMOS image sensor in Embodiment 4 of the present invention.
FIGS. 12(B) to 12(D) are equivalent circuit diagrams of the circuit construction corresponding to on/off of each driving line.

FIG. 12 (A) is a diagram illustrating a more specific construction of signal determination circuit DC. It is an equivalent circuit diagram illustrating the circuit construction of the analog memory and output system of the CMOS image sensor in this embodiment. FIGS. 12(B) to 12(D) are equivalent circuit diagrams illustrating circuit constructions that correspond to on/off states of the various driving lines.

Analog memory M having capacitor CAP is connected to each pixel column. The output column of analog memory M is connected to signal determination circuit DC, and signal-selecting signal SS is output.

The output lines of the analog memory M are connected to the output lines of signal NS1 and signal N1, or signal NS2 and signal N2, not shown in the figure.

The signal determination circuit DC consists of six switches for turning the driving lines on/off ($\phi_1$, $\phi_2$, $\phi_3$), two capacitors ($C_1$, $C_2$) and differential circuit DIF.

Here, the output lines of analog memory M, that is, the lines for input of signal N1 and signal NS1 and the lines connected to two reference voltages $V_{ref\_N1}$, $V_{ref\_NS1}$, are connected via switches that are turned on/off by means of driving lines ($\phi_1$, $\phi_2$, $\phi_3$) to capacitors ($C_1$, $C_2$).

The electrodes on the other side of the capacitors ($C_i$, $C_2$) are connected to inputs of differential circuit DIF. The input of capacitor $C_1$ is on the negative side, and the input of capacitor $C_2$ is on the positive side.

For the differential circuit DIF, a line is arranged for feedback to the input side of $C_1$ via a switch that is turned on/off by driving line ($\phi_1$).

The input from $C_2$ is arranged so that it is grounded via a switch that is turned on/off by driving lines ($\phi_1$, $\phi_2$).

The driving lines ($\phi_1$, $\phi_2$, $\phi_3$) are turned on sequentially. When a line among them is on, the remaining lines are off.

In this embodiment, an abnormal state of signal N1 is detected, thus the embodiment is modified from Embodiment 3.

Figure 13:
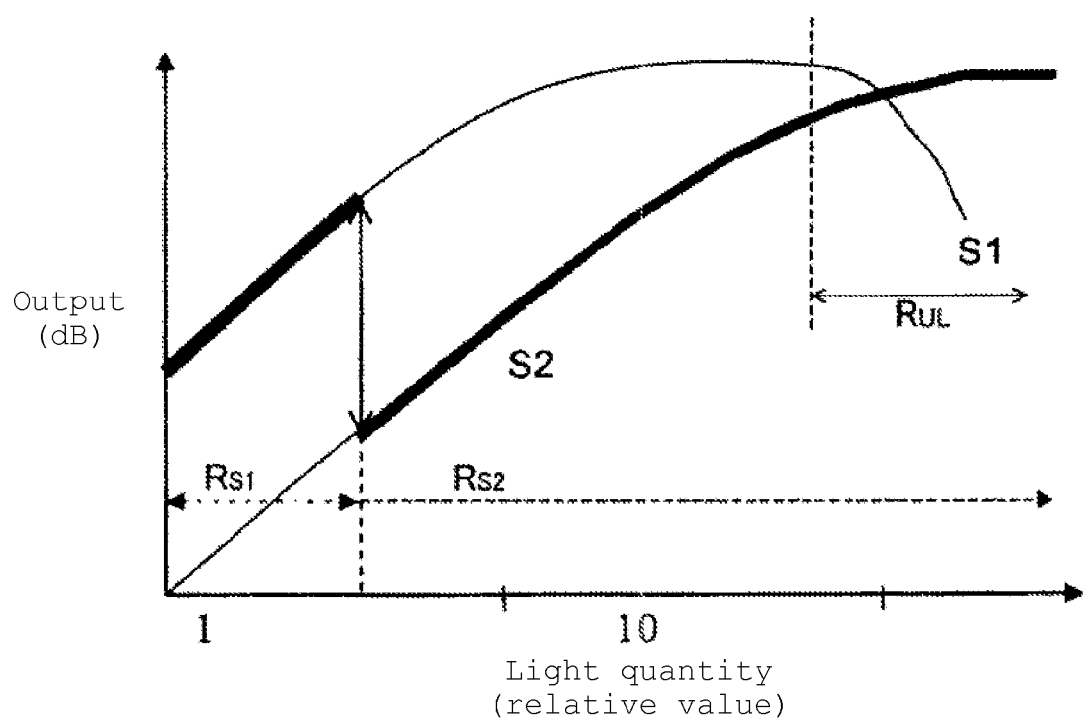
FIG. 13 illustrates the outputs (dB) of signal S1 and signal S2 with respect to the quantity of light irradiated onto the pixels of the CMOS image sensor in Embodiment 4.
Figure 14:
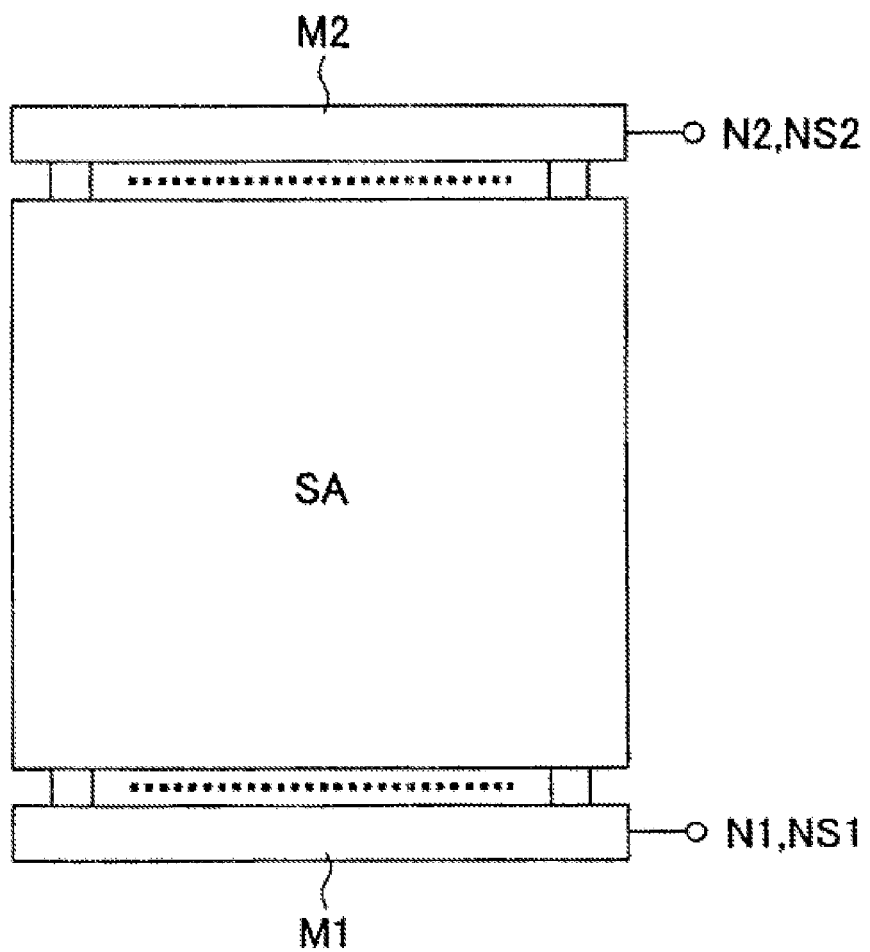
FIG. 14 is a schematic diagram of a CMOS image sensor of the prior art.
Figure 15:
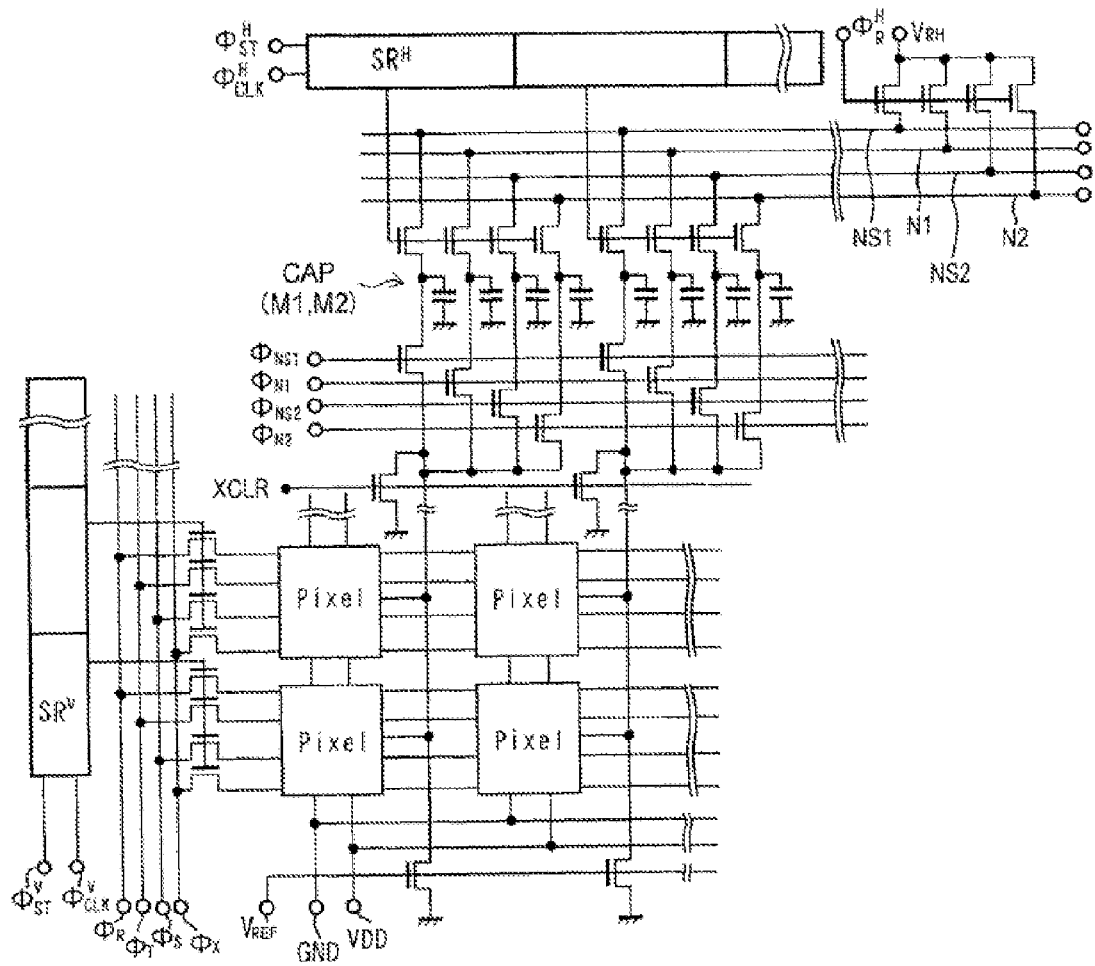
FIG. 15 is an equivalent circuit diagram of the overall circuit construction of a CMOS image sensor of the prior art.
Figure 16:
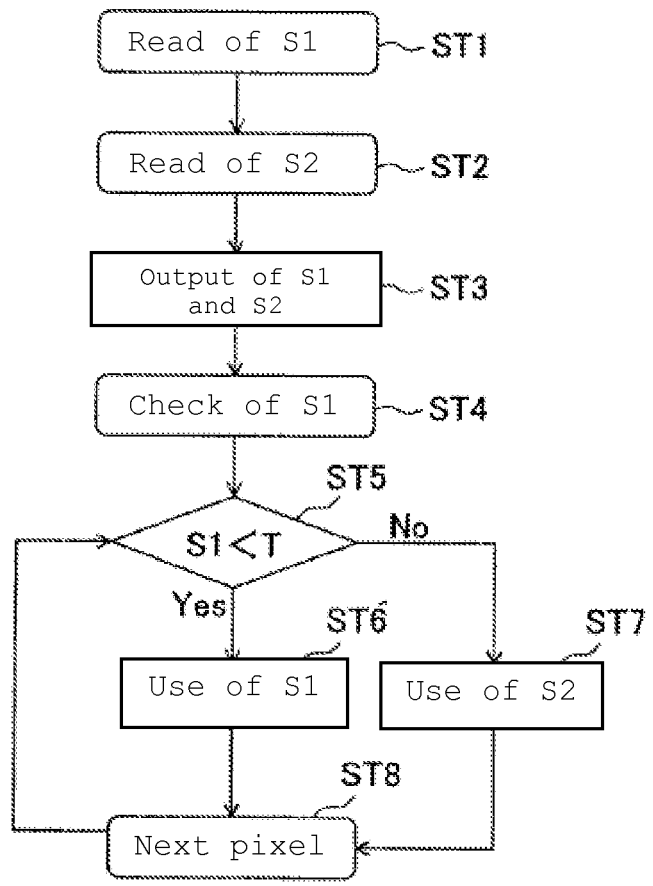
FIG. 16 is a flow chart of the operation of a CMOS image sensor of the prior art.

FIG. 13 is a diagram illustrating the outputs (dB) of signal S1 and signal S2 with respect to the light quantity irradiated on a pixel.

Just as in the embodiment, a prescribed threshold is set with respect to the region where signal S1 is in use, and, in region RS1 not above the threshold, signal S1 is used, while in region RS2 above the threshold, signal S2 is used.

For a pixel that is very bright with saturated signal S1, signal N1 is near ground level. Consequently, as shown in FIG. 13, for signal S1 represented by N1-NS1, region $R_{UL}$ is present where the output decreases abruptly when the light quantity is high. This results in a determination that, although signal S1 is saturated, signal S1 can be used instead of signal S2.

In order to solve the aforementioned problem, comparison of signals at the signal determination circuit in Embodiment 3 is now carried out in two steps in this embodiment.

First, signal N1 is compared in advance with reference voltage $V_{ref\_N1}$.

Driving line $\phi_1$ is turned on. In this case, the circuit shown in FIG. 12(A) is in the state shown in FIG. 12(B). That is, the reference voltage $V_{ref\_N1}$ is input to capacitor $C_1$, the output of which is input to the negative side of differential circuit DIF. The positive side of differential circuit DIF is grounded. For differential circuit DIF, feedback is made to the input on the negative side.

Because the positive side of differential circuit DIF is grounded, reference voltage $V_{ref\_NS1}$ is input to capacitor $C_2$, the output of which is grounded in this circuit.

For $\phi_1$, the level of the reference voltage $V_{ref\_N1}$ is accumulated together with offset of differential circuit DIF in $C_1$. At the same time, the level of reference voltage $V_{ref\_N1}$ is accumulated in $C_2$.

When signal N1 can be obtained directly, or indirectly via a buffer, $\phi_2$ is selected. Here, driving line $\phi_1$ is turned off, and driving line $\phi_2$ is turned on. In this case, the state of the circuit shown in FIG. 12(A) becomes that shown in FIG. 12(C). That is, signal N1 is input to capacitor $C_1$, the output of which is input to the negative side of differential circuit DIF. The positive side of differential circuit DIF is grounded. Feedback of differential circuit DIF is released.

Because the positive side of differential circuit DIF is grounded, the input of capacitor $C_2$ is at the reference voltage. The capacitor $C_2$ accumulates and holds the charge corresponding to reference voltage $V_{ref\_Ns1}$.

In this case, arithmetic and logic operation is executed for $V_{ref\_N1-N1}$. When the obtained difference is positive, it indicates that signal N1 is less than $V_{ref\_N1}$. Because signal S1 becomes reliably saturated, signal S2 is selected automatically.

When the difference is negative, if signal NS1 can be acquired, an immediate change from $\phi_2$ to $\phi_3$ occurs. Here, driving line $\phi_2$ is turned off, and driving line $\phi_3$ is turned on. As a result, the state of the circuit shown in FIG. 12(A) becomes that shown in FIG. 12(D). That is, signal N1 is input to capacitor $C_1$, the output of which is input to the negative side of differential circuit DIF. Signal NS1 is input to capacitor $C_2$, the output of which is input to the positive side of differential circuit DIF. Feedback of differential circuit DIF is maintained released.

In this time band, when mismatch of the capacitors is ignored, the output of differential circuit DIF becomes an output that follows the sign of $-[(N1-NS1)-(V_{ref\_N1}-V_{ref\_Ns1})]=V_{ref}-S_1$.

By selecting appropriate values for $V_{ref\_N1}$ and $V_{ref\_NS1}$ the two comparisons are possible with the same voltage. When excess saturation is entirely about in signal S1, it is preferred that the threshold voltage $V_{ref\_N1}$ be set at a level a little lower than that of expected signal N1. Automatic adjustment is possible such that this level is in agreement with one of the OB pixels (black standard pixels).

Just as in Embodiment 1, for the solid-state image pickup device of this embodiment, in a solid-state image pickup device with a wider dynamic range, it is determined which of signal S1 and signal S2 is in use. When it is determined that the first signal is selected, the second signal is discarded. When it is determined that the second signal is selected, the second signal is uploaded to the memory, so the same circuit can be used as both a circuit for signal S1 and a circuit for signal S2. As a result, the device can be miniaturized.

The driving method for the solid-state image pickup device of this embodiment works just like that in Embodiment 1. Because the same circuit can function as both a circuit for signal S1 and a circuit for signal S2, the device can be miniaturized.

The present invention is not limited to the aforementioned explanation.

For example, in the above explanation, it is assumed that the CMOS sensor has five transistors for each pixel. However, the present invention may be adopted in a case in which the CMOS sensor has more transistors for each pixel.

The present invention is not restricted to signal S1 and signal S2. For an image sensor with a construction for acquiring two rounds of different signals from each pixel, with regard to which of the two rounds of signals should be used, the construction may be such that after determination of whether the signal is in use after acquisition of one signal, as needed, the other signal may be acquired. In this way, just like the CMOS image sensors in the embodiments, the circuit for acquisition of the signal can be simplified.

Various other modifications may be adopted as long as the gist of the present invention is observed.

The solid-state image pickup device of the present invention may be adopted in an image sensor for which a wide dynamic range is required, such as a CMOS image sensor or CCD image sensor carried in a digital camera, camera-equipped cell phone, etc.

The driving method for the solid-state image pickup device of the present invention can be adopted in driving an image sensor for which a wide dynamic range is required.

What is claimed is:

1. A solid-state image pickup device comprising:
a sensor array including plural pixels disposed in an array of rows and columns on a semiconductor substrate, each pixel including
a photodiode generating photoelectric charge upon receiving light and storing said generated photoelectric charge,
a transfer transistor connected to said photodiode for transferring said photoelectric charge from said photodiode,
a floating diffusion that transfers said photoelectric charge through said transfer transistor,
an accumulating capacitive element connected to said photodiode via said transfer transistor and which works in an accumulating operation so that photoelectric charge flowing out from said photodiode is at least accumulated in it via said transfer transistor,
an accumulating transistor, which couples or separates said floating diffusion and the potential of said accumulating capacitive element, and which has one source/drain region as said floating diffusion and connects the other source/drain region to said floating diffusion, and
an amplification transistor having a gate electrode connected to said floating diffusion,
each pixel sequentially outputting a first signal and a second signal, said first signal corresponding to the signal charge accumulated in said floating diffusion when said accumulating transistor is turned off and said second signal corresponding to the signal charge accumulated in said floating diffusion and said accumulating capacitive element when said accumulating transistor is turned on;
a memory connected to each column of said array of pixels storing said first signal and said second signal;

a signal determination circuit connected to said pixel array and said memory, said signal determination circuit selecting either said first signal or said second signal for storage in said memory, said signal determination circuit further outputting a signal indicating said selection.

2. The solid-state image pickup device of claim 1, wherein:
said signal determination circuit determines whether said first signal is input to said memory, and uploads said second signal to said memory to be stored if said second signal is selected.

3. The solid-state image pickup device of claim 1, wherein:
said signal determination circuit is operable to compare said first signal with a prescribed threshold,
determine if said first signal is lower than said prescribed threshold,
select said first signal if said first signal is lower than said threshold, and
select said second signal if said first signal is not less than said threshold.

4. The solid-state image pickup device of claim 1, wherein:
said signal determination circuit generates and outputs a selection bit indicating which of said first signal and second signal is selected.

5. The solid-state image pickup device of claim 1, wherein:
each pixel further includes a reset transistor connected to said accumulating capacitive element for discharging said photoelectric charge stored in said accumulating capacitive element.

6. The solid-state image pickup device of claim 1, wherein:
each pixel further includes a reset transistor connected to said floating diffusion for discharging said photoelectric charge in said floating diffusion.

7. The solid-state image pickup device of claim 1, wherein:
each pixel is connected in series with said amplification transistor and further includes a selecting transistor selectively connecting said pixel to a gate electrode.

8. A driving method for a solid-state image pickup device, comprising the steps of:
sequentially generating for each pixel of a sensor array of plural pixels in rows and columns integrated on a semiconductor substrate a first signal and a second signal, said sequentially generating including
generating the first signal corresponding to a photoelectric charge of the pixel accumulated on a first capacitance, and
generating the second signal corresponding to a photoelectric charge of the pixel accumulated on a second capacitance greater than said first capacitance;
receiving the first signal and the second signal sequentially output as pixel outputs from each pixel;
storing said first signal from each pixel in a memory connected to each column of the sensor array of pixels;
determining whether said first signal from each pixel is selected as the pixel output signal for that pixel;
when said first signal from a pixel is selected, discarding said second signal from the pixel;
when said first signal from a pixel is not selected, storing said second signal from the pixel in the memory; and
outputting the selected one of said first signal or said second signal as a pixel output signal of the corresponding pixel from the memory.

9. The driving method for a solid-state image pickup device of claim 8, wherein:
said step of determining whether said first signal from each pixel is selected as a pixel output signal includes
comparing said first signal from each pixel with a prescribed threshold,
if said first signal from the pixel is lower than said prescribed threshold, determining that said first signal from the pixel is selected,
if said first signal from the pixel is greater than said prescribed threshold, determining that said first signal from the pixel is not selected.

10. The driving method for a solid-state image pickup device of claim 8, wherein:
said step of determining whether said first signal from a pixel is selected as a pixel output signal includes
generating a selection bit that indicates whether said first signal from the pixel is selected, and
outputting the selection bit.

* * * * *